US011436642B1

(12) United States Patent
Podgorny et al.

(10) Patent No.: US 11,436,642 B1
(45) Date of Patent: Sep. 6, 2022

(54) METHOD AND SYSTEM FOR GENERATING REAL-TIME PERSONALIZED ADVERTISEMENTS IN DATA MANAGEMENT SELF-HELP SYSTEMS

(71) Applicant: Intuit Inc., Mountain View, CA (US)

(72) Inventors: Igor A. Podgorny, San Diego, CA (US); Benjamin Indyk, San Diego, CA (US); Tom Kowalski, Boston, MA (US); Ameya U. Patil, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 204 days.

(21) Appl. No.: 15/882,854

(22) Filed: Jan. 29, 2018

(51) Int. Cl.
*G06Q 30/02* (2012.01)
*G06Q 40/00* (2012.01)
(Continued)

(52) U.S. Cl.
CPC ..... *G06Q 30/0271* (2013.01); *G06F 16/3329* (2019.01); *G06N 20/00* (2019.01); *G06Q 30/0256* (2013.01); *G06Q 40/123* (2013.12)

(58) Field of Classification Search
CPC ........... G06Q 30/0271; G06Q 30/0256; G06Q 40/123; G06F 16/3329; G06N 20/00
(Continued)

(56) References Cited

U.S. PATENT DOCUMENTS 5,471,382 A 11/1995 Tallman et al.
5,519,608 A 5/1996 Kupiec
(Continued)

FOREIGN PATENT DOCUMENTS

AU 2001259223 B2 11/2001
CN 101520802 4/2009
(Continued)

OTHER PUBLICATIONS

"Textual Paralanguage and Its Implications for Marketing Communications" Andreas Webb Luangrath, et al; May 23, 2016 (Year: 2016).*

(Continued)

*Primary Examiner* — Victoria E. Frunzi
(74) *Attorney, Agent, or Firm* — Paradice and Li LLP

(57) ABSTRACT

A method and system provide a data management system that provides data management services and products to users. The method and system provide a self-help service including an assistance documents database including a large number of assistance documents. The data management system includes a database of messaging content including a large number of messages that can be provided with assistance documents accessed by users. The data management system includes a predictive model that has been trained with a machine learning process to match messages from the messaging content database to assistance documents. When a user accesses an assistance document, the predictive model matches the assistance document to a message from the messaging content database in real time. The data management system provides personalized messaging content data including the matched message in real time with the assistance documents accessed by the user.

30 Claims, 4 Drawing Sheets

(51) Int. Cl.
*G06F 16/332* (2019.01)
*G06N 20/00* (2019.01)

(58) Field of Classification Search
USPC .................................................. 705/14.67
See application file for complete search history.

(56) References Cited

U.S. PATENT DOCUMENTS

| | | |
|---|---|---|
| 5,701,399 A | 12/1997 | Lee et al. |
| 6,006,218 A | 12/1999 | Breese et al. |
| 6,147,975 A | 11/2000 | Bowman-Amuah |
| 6,256,633 B1 | 7/2001 | Dharap |
| 6,349,307 B1 | 2/2002 | Chen |
| 6,513,036 B2 | 1/2003 | Fruensgaard et al. |
| 6,564,213 B1 | 5/2003 | Ortega et al. |
| 6,601,055 B1 | 7/2003 | Roberts |
| 6,708,172 B1 | 3/2004 | Wong et al. |
| 6,853,982 B2 | 2/2005 | Smith et al. |
| 7,013,263 B1 | 3/2006 | Isaka et al. |
| 7,222,078 B2 | 5/2007 | Abelow |
| 7,385,716 B1 | 6/2008 | Skaanning |
| 7,424,510 B2 | 9/2008 | Gross et al. |
| 7,565,312 B1 | 7/2009 | Shaw et al. |
| 7,587,387 B2 | 9/2009 | Hogue |
| 7,594,176 B1 | 9/2009 | English |
| 7,603,301 B1 | 10/2009 | Regan |
| 7,610,226 B1 | 10/2009 | Miller |
| 7,620,607 B1* | 11/2009 | Ershov ................ G06F 16/9535 706/12 |
| 7,627,504 B2 | 12/2009 | Brady et al. |
| 7,685,144 B1 | 3/2010 | Katragadda |
| 7,739,286 B2 | 6/2010 | Sethy et al. |
| 7,747,601 B2 | 6/2010 | Cooper et al. |
| 7,877,402 B1 | 1/2011 | Weiss et al. |
| 7,890,526 B1 | 2/2011 | Brewer et al. |
| 7,966,282 B2 | 6/2011 | Pinckney et al. |
| 7,974,860 B1 | 7/2011 | Travis |
| 8,010,545 B2 | 8/2011 | Stefik et al. |
| 8,019,753 B2 | 9/2011 | Podgorny et al. |
| 8,185,517 B1 | 5/2012 | Wood et al. |
| 8,200,527 B1 | 6/2012 | Thompson et al. |
| 8,209,333 B2 | 6/2012 | Hubbard et al. |
| 8,271,471 B1 | 9/2012 | Kamvar et al. |
| 8,311,792 B1 | 11/2012 | Podgorny et al. |
| 8,311,863 B1 | 11/2012 | Kemp |
| 8,341,167 B1 | 12/2012 | Podgorny et al. |
| 8,473,339 B1 | 6/2013 | McKennon et al. |
| 8,478,780 B2 | 7/2013 | Cooper et al. |
| 8,484,228 B2 | 7/2013 | Bhattacharyya et al. |
| 8,631,006 B1 | 1/2014 | Haveliwala et al. |
| 8,645,298 B2 | 2/2014 | Hennig et al. |
| 8,660,849 B2 | 2/2014 | Gruber et al. |
| 8,732,222 B2 | 5/2014 | Horvitz et al. |
| 8,805,734 B2 | 8/2014 | Diana et al. |
| 8,817,968 B1 | 8/2014 | Boutcher et al. |
| 8,850,490 B1* | 9/2014 | Thomas ............ H04N 21/47211 725/109 |
| 8,892,539 B2 | 11/2014 | Anand et al. |
| 8,909,568 B1 | 12/2014 | Mann et al. |
| 8,935,192 B1 | 1/2015 | Ventilla et al. |
| 8,943,145 B1 | 1/2015 | Peters et al. |
| 8,972,318 B2 | 3/2015 | Prakash et al. |
| 8,983,977 B2 | 3/2015 | Ishikawa et al. |
| 9,015,031 B2 | 4/2015 | Ferrucci et al. |
| 9,037,578 B2 | 5/2015 | Brust et al. |
| 9,060,062 B1 | 6/2015 | Madahar et al. |
| 9,063,983 B1 | 6/2015 | Lee |
| 9,229,974 B1 | 1/2016 | Lee et al. |
| 9,235,626 B2 | 1/2016 | Liu et al. |
| 9,247,066 B1 | 1/2016 | Stec et al. |
| 9,262,528 B2 | 2/2016 | Cooper et al. |
| 9,336,211 B1 | 5/2016 | Bousquet et al. |
| 9,336,269 B1 | 5/2016 | Smith et al. |
| 9,342,608 B2 | 5/2016 | Cook et al. |
| 9,460,191 B1 | 10/2016 | Gaucher et al. |
| 9,471,883 B2 | 10/2016 | Chatterjee et al. |
| 9,582,757 B1 | 2/2017 | Holmes et al. |
| 9,633,309 B2 | 4/2017 | Giffels et al. |
| 9,747,390 B2 | 8/2017 | Cooper et al. |
| 9,767,169 B1 | 9/2017 | Paff et al. |
| 9,779,388 B1 | 10/2017 | Hansen et al. |
| 9,881,102 B2 | 1/2018 | Gordner et al. |
| 9,887,887 B2 | 2/2018 | Hunter et al. |
| 9,892,367 B2 | 2/2018 | Guo et al. |
| 9,910,886 B2 | 3/2018 | Adams, Jr. et al. |
| 10,002,177 B1 | 6/2018 | McClintock et al. |
| 10,049,664 B1 | 8/2018 | Indyk et al. |
| 10,083,213 B1 | 9/2018 | Podgorny et al. |
| 10,134,050 B1 | 11/2018 | Hung et al. |
| 10,147,037 B1 | 12/2018 | Podgorny et al. |
| 10,162,734 B1 | 12/2018 | Podgorny et al. |
| 10,210,244 B1 | 2/2019 | Branavan et al. |
| 10,354,182 B2 | 7/2019 | Chang et al. |
| 10,460,398 B1 | 10/2019 | Gielow et al. |
| 10,475,044 B1 | 11/2019 | Cannon et al. |
| 10,522,134 B1 | 12/2019 | Matsoukas |
| 10,552,843 B1 | 2/2020 | Podgorny et al. |
| 10,579,625 B2 | 3/2020 | Cho et al. |
| 10,594,757 B1* | 3/2020 | Shevchenko ......... H04L 67/306 |
| 10,748,157 B1 | 8/2020 | Indyk et al. |
| 10,755,294 B1 | 8/2020 | Podgorny et al. |
| 11,093,951 B1 | 8/2021 | Podgorny et al. |
| 2002/0087387 A1 | 7/2002 | Calver et al. |
| 2002/0111888 A1 | 8/2002 | Stanley et al. |
| 2002/0111926 A1 | 8/2002 | Bebie |
| 2002/0123983 A1 | 9/2002 | Riley et al. |
| 2002/0169595 A1 | 11/2002 | Agichtein et al. |
| 2003/0028448 A1 | 2/2003 | Joseph et al. |
| 2003/0061131 A1 | 3/2003 | Parkan |
| 2003/0099924 A1 | 5/2003 | Tsuboi et al. |
| 2003/0101161 A1 | 5/2003 | Ferguson et al. |
| 2003/0115318 A1 | 6/2003 | Wueste |
| 2003/0144873 A1 | 7/2003 | Keshel |
| 2004/0024739 A1 | 2/2004 | Copperman et al. |
| 2004/0034652 A1 | 2/2004 | Homann et al. |
| 2004/0064442 A1 | 4/2004 | Popovitch |
| 2005/0086290 A1 | 4/2005 | Joyce et al. |
| 2005/0114327 A1 | 5/2005 | Kumamoto et al. |
| 2005/0137939 A1 | 6/2005 | Calabria et al. |
| 2005/0222989 A1* | 10/2005 | Haveliwala ............ G06Q 30/02 |
| 2005/0246314 A1 | 11/2005 | Eder |
| 2006/0064322 A1 | 3/2006 | Mascarenhas et al. |
| 2006/0074788 A1 | 4/2006 | Grizack et al. |
| 2006/0085255 A1 | 4/2006 | Hastings et al. |
| 2006/0085750 A1 | 4/2006 | Easton et al. |
| 2006/0253578 A1 | 11/2006 | Dixon et al. |
| 2006/0265232 A1 | 11/2006 | Katariya et al. |
| 2007/0011131 A1 | 1/2007 | Delefevre |
| 2007/0118519 A1 | 5/2007 | Yamasawa et al. |
| 2007/0143262 A1 | 6/2007 | Kasperski |
| 2007/0192166 A1 | 8/2007 | Van Luchene |
| 2007/0192168 A1 | 8/2007 | Van Luchene |
| 2007/0192179 A1 | 8/2007 | Van Luchene |
| 2007/0219863 A1 | 9/2007 | Park et al. |
| 2007/0244900 A1 | 10/2007 | Hopkins et al. |
| 2007/0259325 A1 | 11/2007 | Clapper |
| 2007/0291739 A1 | 12/2007 | Sullivan et al. |
| 2007/0294195 A1 | 12/2007 | Curry et al. |
| 2008/0189197 A1 | 8/2008 | Allanson et al. |
| 2008/0201413 A1 | 8/2008 | Sullivan et al. |
| 2008/0208610 A1 | 8/2008 | Thomas et al. |
| 2008/0214151 A1 | 9/2008 | Ramer et al. |
| 2008/0215541 A1 | 9/2008 | Li et al. |
| 2008/0248815 A1 | 10/2008 | Busch |
| 2008/0294637 A1 | 11/2008 | Liu |
| 2009/0012926 A1 | 1/2009 | Ishikawa et al. |
| 2009/0077047 A1 | 3/2009 | Cooper et al. |
| 2009/0089286 A1 | 4/2009 | Kumar et al. |
| 2009/0106224 A1 | 4/2009 | Roulland et al. |
| 2009/0119575 A1 | 5/2009 | Velusamy |
| 2009/0158143 A1 | 6/2009 | Arav |
| 2009/0162824 A1 | 6/2009 | Heck |
| 2009/0198667 A1 | 8/2009 | Groeneveld et al. |
| 2009/0248659 A1 | 10/2009 | McCool et al. |

(56) References Cited

U.S. PATENT DOCUMENTS

| | | |
|---|---|---|
| 2009/0253112 A1 | 10/2009 | Cao et al. |
| 2009/0259642 A1 | 10/2009 | Cao et al. |
| 2009/0265340 A1 | 10/2009 | Barcklay et al. |
| 2009/0292609 A1* | 11/2009 | Vaidyanathan ........ G06Q 30/02 705/14.49 |
| 2010/0068687 A1 | 3/2010 | Bertelsen |
| 2010/0070554 A1 | 3/2010 | Richardson et al. |
| 2010/0076847 A1 | 3/2010 | Heller |
| 2010/0076998 A1* | 3/2010 | Podgorny .............. G06Q 10/10 |
| 2010/0082649 A1 | 4/2010 | Gutt et al. |
| 2010/0088262 A1 | 4/2010 | Visel et al. |
| 2010/0125781 A1* | 5/2010 | Gadacz ................ G06F 16/972 715/234 |
| 2010/0017388 A1 | 6/2010 | Glover |
| 2010/0138451 A1* | 6/2010 | Henkin .................. G06Q 30/02 707/803 |
| 2010/0185630 A1 | 7/2010 | Cheng et al. |
| 2010/0191686 A1 | 7/2010 | Wang et al. |
| 2010/0203492 A1 | 8/2010 | Nibe et al. |
| 2010/0205180 A1 | 8/2010 | Cooper et al. |
| 2010/0205550 A1 | 8/2010 | Chen et al. |
| 2010/0228744 A1 | 9/2010 | Craswell et al. |
| 2010/0235361 A1 | 9/2010 | Chandran et al. |
| 2010/0241507 A1 | 9/2010 | Quinn et al. |
| 2010/0241971 A1 | 9/2010 | Zuber |
| 2010/0318919 A1 | 12/2010 | Murphy et al. |
| 2011/0055110 A1 | 3/2011 | Kolyvanov et al. |
| 2011/0055699 A1 | 3/2011 | Li et al. |
| 2011/0071997 A1 | 3/2011 | Sullivan et al. |
| 2011/0106743 A1 | 5/2011 | Duchon |
| 2011/0106895 A1 | 5/2011 | Ventilla et al. |
| 2011/0125734 A1 | 5/2011 | Duboue et al. |
| 2011/0202472 A1 | 8/2011 | Wan et al. |
| 2011/0231347 A1 | 9/2011 | Xu et al. |
| 2011/0246334 A1 | 10/2011 | Schoenberg et al. |
| 2011/0264569 A1 | 10/2011 | Houseworth et al. |
| 2011/0282892 A1 | 11/2011 | Castellani et al. |
| 2011/0295612 A1 | 12/2011 | Donneau-Golencer et al. |
| 2012/0005148 A1 | 1/2012 | Horvitz et al. |
| 2012/0005219 A1 | 1/2012 | Apacible et al. |
| 2012/0022983 A1 | 1/2012 | Hughes et al. |
| 2012/0030079 A1 | 2/2012 | Slater et al. |
| 2012/0036053 A1 | 2/2012 | Miller |
| 2012/0077178 A1 | 3/2012 | Bagchi et al. |
| 2012/0084120 A1 | 4/2012 | Hirsch et al. |
| 2012/0084185 A1 | 4/2012 | Ciaramitaro et al. |
| 2012/0084279 A1 | 4/2012 | Driscoll et al. |
| 2012/0084293 A1 | 4/2012 | Brown et al. |
| 2012/0095976 A1 | 4/2012 | Hebenthal et al. |
| 2012/0101965 A1 | 4/2012 | Hennig et al. |
| 2012/0130910 A1 | 5/2012 | Al-Alami |
| 2012/0130978 A1 | 5/2012 | Li et al. |
| 2012/0136764 A1 | 5/2012 | Miller et al. |
| 2012/0150861 A1 | 6/2012 | Thione et al. |
| 2012/0166438 A1 | 6/2012 | Wu et al. |
| 2012/0219142 A1 | 8/2012 | Gould |
| 2012/0221557 A1 | 8/2012 | Edmonds et al. |
| 2012/0233191 A1 | 9/2012 | Ramanujam |
| 2012/0331052 A1 | 12/2012 | Rathod |
| 2013/0006914 A1 | 1/2013 | Ray et al. |
| 2013/0019286 A1 | 1/2013 | Barborak et al. |
| 2013/0024290 A1 | 1/2013 | Berg et al. |
| 2013/0054497 A1 | 2/2013 | Garland et al. |
| 2013/0066693 A1 | 3/2013 | Laird-McConnell et al. |
| 2013/0073387 A1 | 3/2013 | Heath |
| 2013/0073390 A1 | 3/2013 | Konig et al. |
| 2013/0103493 A1* | 4/2013 | Gao ....................... G06Q 10/10 705/14.46 |
| 2013/0110671 A1 | 5/2013 | Gray |
| 2013/0110823 A1 | 5/2013 | Su et al. |
| 2013/0111323 A1 | 5/2013 | Taghaddos et al. |
| 2013/0117677 A1 | 5/2013 | St. Jacques, Jr. |
| 2013/0124449 A1 | 5/2013 | Pinckney et al. |
| 2013/0159233 A1 | 6/2013 | Mason et al. |
| 2013/0204876 A1 | 8/2013 | Szucs et al. |
| 2013/0224713 A1 | 8/2013 | Ajmera et al. |
| 2013/0268319 A1 | 10/2013 | Palombo |
| 2013/0275408 A1 | 10/2013 | Rodriguez et al. |
| 2013/0282363 A1 | 10/2013 | Fan et al. |
| 2013/0285855 A1 | 10/2013 | Dupray et al. |
| 2013/0297545 A1 | 11/2013 | Bierner et al. |
| 2013/0297553 A1 | 11/2013 | Bierner |
| 2013/0297625 A1 | 11/2013 | Bierner et al. |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1 | 1/2014 | Zhou et al. |
| 2014/0022328 A1 | 1/2014 | Gechter et al. |
| 2014/0052496 A1 | 2/2014 | Diana et al. |
| 2014/0052606 A1 | 2/2014 | Vasudevan et al. |
| 2014/0052716 A1 | 2/2014 | Chakra et al. |
| 2014/0075004 A1 | 3/2014 | Van Dusen et al. |
| 2014/0088944 A1 | 3/2014 | Natarajan et al. |
| 2014/0114822 A1 | 4/2014 | Sharma et al. |
| 2014/0119531 A1 | 5/2014 | Tuchman et al. |
| 2014/0172883 A1 | 6/2014 | Clark et al. |
| 2014/0181652 A1 | 6/2014 | Stanke et al. |
| 2014/0189829 A1 | 7/2014 | McLachlan et al. |
| 2014/0195613 A1 | 7/2014 | Ogilvie |
| 2014/0201045 A1 | 7/2014 | Pai et al. |
| 2014/0222669 A1 | 8/2014 | Novak et al. |
| 2014/0244528 A1 | 8/2014 | Zhang et al. |
| 2014/0280055 A1 | 9/2014 | Chang et al. |
| 2014/0280070 A1 | 9/2014 | George et al. |
| 2014/0297268 A1 | 10/2014 | Govrin et al. |
| 2014/0308648 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0006344 A1 | 1/2015 | Saimani et al. |
| 2015/0052087 A1 | 2/2015 | Srinivasan et al. |
| 2015/0058380 A1 | 2/2015 | Polonsky et al. |
| 2015/0088608 A1 | 3/2015 | Cama et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0170049 A1 | 6/2015 | Mann et al. |
| 2015/0213021 A1 | 7/2015 | He et al. |
| 2015/0229531 A1 | 8/2015 | O'Sullivan et al. |
| 2015/0242906 A1 | 8/2015 | Liu et al. |
| 2015/0254785 A1 | 9/2015 | Yang |
| 2015/0278241 A1 | 10/2015 | Bates-Haus et al. |
| 2015/0317197 A1 | 11/2015 | Blair |
| 2015/0317449 A1 | 11/2015 | Eder |
| 2015/0324367 A1 | 11/2015 | Aravamudan et al. |
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0078567 A1 | 3/2016 | Goldman et al. |
| 2016/0103833 A1 | 4/2016 | Sanders et al. |
| 2016/0147760 A1 | 5/2016 | N et al. |
| 2016/0148222 A1 | 5/2016 | Davar et al. |
| 2016/0148321 A1 | 5/2016 | Ciaramitaro et al. |
| 2016/0154856 A1 | 6/2016 | Olof-Ors et al. |
| 2016/0179816 A1 | 6/2016 | Glover |
| 2016/0180470 A1 | 6/2016 | Mascaro et al. |
| 2016/0188731 A1 | 6/2016 | Dai et al. |
| 2016/0189029 A1 | 6/2016 | Giffels et al. |
| 2016/0196497 A1 | 7/2016 | Allen et al. |
| 2016/0203523 A1 | 7/2016 | Spasojevic et al. |
| 2016/0217472 A1 | 7/2016 | Podgorny et al. |
| 2016/0247165 A1 | 8/2016 | Ryabchun et al. |
| 2016/0259844 A1 | 9/2016 | Trapeznikov et al. |
| 2016/0283491 A1 | 9/2016 | Lu et al. |
| 2016/0306846 A1 | 10/2016 | Adams, Jr. et al. |
| 2016/0371276 A1 | 12/2016 | Furtado et al. |
| 2017/0011352 A1 | 1/2017 | Jones-McFadden et al. |
| 2017/0017899 A1 | 1/2017 | Maor et al. |
| 2017/0024424 A1 | 1/2017 | Almohizea |

(56) References Cited

U.S. PATENT DOCUMENTS

| | | | |
|---|---|---|---|
| 2017/0032251 | A1 | 2/2017 | Podgorny et al. |
| 2017/0032468 | A1 | 2/2017 | Wang et al. |
| 2017/0046623 | A1 | 2/2017 | Murdock et al. |
| 2017/0053026 | A1 | 2/2017 | Musuluri et al. |
| 2017/0124184 | A1 | 5/2017 | Podgorny et al. |
| 2017/0213130 | A1 | 7/2017 | Khatri et al. |
| 2017/0228459 | A1 | 8/2017 | Wang et al. |
| 2017/0235848 | A1 | 8/2017 | Van Dusen et al. |
| 2017/0262529 | A1 | 9/2017 | Chim et al. |
| 2017/0262900 | A1* | 9/2017 | Ramachandran .... G06Q 10/067 |
| 2017/0270159 | A1 | 9/2017 | Wang et al. |
| 2017/0308613 | A1 | 10/2017 | Zhu et al. |
| 2017/0323233 | A1 | 11/2017 | Bencke et al. |
| 2018/0032523 | A1 | 2/2018 | Singhal et al. |
| 2018/0032607 | A1 | 2/2018 | Singhal et al. |
| 2018/0032890 | A1 | 2/2018 | Podgorny et al. |
| 2018/0089283 | A1 | 3/2018 | Indyk et al. |
| 2018/0108092 | A1 | 4/2018 | Goodyear et al. |
| 2018/0108093 | A1 | 4/2018 | Podgorny et al. |
| 2018/0113935 | A1 | 4/2018 | George et al. |
| 2018/0121550 | A1 | 5/2018 | Jeon et al. |
| 2018/0137203 | A1 | 5/2018 | Hennekey et al. |
| 2018/0165758 | A1* | 6/2018 | Saxena ................. G06Q 30/02 |
| 2018/0174055 | A1 | 6/2018 | Tirumale et al. |
| 2018/0189292 | A1 | 7/2018 | Grace, Jr. et al. |
| 2018/0196796 | A1 | 7/2018 | Wu |
| 2018/0204106 | A1 | 7/2018 | Beller et al. |
| 2018/0287968 | A1 | 10/2018 | Koukoumidis et al. |
| 2018/0321951 | A1 | 11/2018 | Fitzgerald et al. |
| 2019/0018692 | A1 | 1/2019 | Indyk et al. |
| 2019/0018899 | A1 | 1/2019 | Podgorny et al. |
| 2019/0065576 | A1 | 2/2019 | Peng et al. |
| 2019/0103035 | A1 | 4/2019 | Beller et al. |
| 2020/0027095 | A1 | 1/2020 | Cannon et al. |
| 2020/0134635 | A1 | 4/2020 | Podgorny et al. |
| 2020/0134738 | A1 | 4/2020 | Goodyear et al. |
| 2020/0327622 | A1 | 10/2020 | Podgorny et al. |
| 2020/0357009 | A1 | 11/2020 | Podgorny et al. |

FOREIGN PATENT DOCUMENTS

| | | |
|---|---|---|
| EP | 2159715 | 3/2010 |
| JP | 2014112316 | 6/2014 |
| WO | 2001082202 A2 | 11/2001 |
| WO | WO 2011/053830 | 5/2011 |

OTHER PUBLICATIONS

Blei, David M., et al. "Latent Dirichlet Allocation;" Journal of Machine Learning Research 3, Jan. 2003, pp. 993-1022.

Steyvers, Mark, et al. "Probabilistic Author-Topic Models for Information Discovery;" KDD'04, Aug. 22-25, 2004.

Mimno, David, et al., "Sparse Stochastic Inference for Latent Dirichlet Allocation," Proceedings of the 29th International Conference on Machine Learning, Edinburgh, Scotland, UK, 2012.

Blei, David M., "Probabilistic Topic Models," Communications of the ACM, Apr. 2012, vol. 55, No. 4, pp. 77-84.

Grant, Sheryl, et al., "The Human Face of Crowdsourcing: A Citizen-led Crowdsourcing Case Study;" 2013 IEEE International Conference on Big Data, Silicon Valley, CA, 2013, pp. 21-24.

Encyclopedia Britannica, "Graphical User Interface (GUI);" Sep. 5, 2015. Retrieved from the internet <URL: https://www.britannica.com/technology/graphical-user-interface>.

Wikipedia, "Widget (GUI)," Sep. 7, 2016. Retrieved from the internet <URL: https://en.wikipedia.org/w/index.php?title=Widget_(GUI)&oldid=738206274>.

Dror, et al., "From Query to Question in One Click: Suggesting Synthetic Questions to Searchers," International World Wide Web Conferences Steering Committee, May 13, 2013, pp. 391-401.

The Scientific Marketer, "Uplift Modelling FAQ", article date of Sep. 27, 2007, retrieved from http://scientificmarketer.com/2007/09/uplift-modelling-faq.html (Year: 2007).

Zadeh, Z.; "Probabilistic Modeling In Community-Based Question Answering Services," Dalhousie University, Halifax, Nova Scotia; Feb. 2012.

Podgorny, et al., "Content Quality and User Ranking in TurboTax AnswerXchange," Proceedings of the European Conference on Social Media, University of Brighton UK, Jul. 10-11, 2014.

Podgorny, et al. "Real Time Detection and Intervention of Poorly Phrased Questions," CHI EA '15, Proceedings of the 33rd Annual ACM Conference Extended Abstracts on Human Factors in Computing Systems, Apr. 18-23, 2015, Seoul, Republic of Korea, pp. 2205-2210.

Bartolome et al., "Processing Unstructured Voice of Customer Feedback for Improving Content Rankings in Customer Support Systems," U.S. Appl. No. 15/094,653, filed Apr. 8, 2016.

Get Satisfaction [online]. Sprinklr, 2017 [retrieved on Nov. 22, 2017]. Retrieved from the Internet: <URL: https://getsatisfaction.com/corp>.

Fitchett et al., "An Empirical Characterisation of File Retrieval," Oct. 3, 2014, University of Canterbury, Christchurch, New Zealand, Int. J. Human-Computer Studies 74 (2015), pp. 1-13 (Year: 2014).

Han et al., "Understanding and Supporting Cross-Device Web Search for Exploratory Tasks with Mobile Touch Interactions," Apr. 2015, ACM Transactions on Information System, vol. 33, No. 4, pp. 1-35, (Year: 2015).

Kumar et al., "Personalized Web search Using Browsing History and Domain Knowledge" International Conference on Issues and Challenges in Intelligent Computing Techniques (ICICT), IEEE 2014, pp. 493-497, (Year: 2014).

Wen et al., "Clustering user Queries of a Search Engine," Proceedings of the 10th International Conference on World Wide Web, pp. 162-168, ACM, 2001 (Year: 2001).

Negoescu et al., "Modeling Flickr Communities Through Probabilistic Topic-Based Analysis," IEEE Transactions on Multimedia, vol. 12, No. 5, pp. 399-416, Aug. 2010.

Ponzanelli et al., "Understanding and Classifying the Quality of Technical Forum Questions," IEEE, 14th International Conference on Quality Software, pp. 343-352 (Year: 2014).

Wikipedia, "Incremental Search," Jul. 22, 2016. Retrieved from the internet on Mar. 11, 2020 <URL: https://en.wikipedia.org/w/index.php?title=incremental_search&oldid=731052532>, 5 pages (Year 2016).

Zolaktaf Zadeh, "Probabilistic Modeling in Community-Based Question Answering Services," Dalhousie University, Halifax, NS, Canada, pp. 1-62, Feb. 29, 2012, retrived from internet on Dec. 17, 2020 at https://dalspace.library.dal.ca/handle/10222/14584.

Garg et al., "Mining Top Issues from Contact Center Logs for Self Help Portals," 2008 IEEE International Conference on Services Computing, pp. 171-178, Jul. 2008.

McGee, Google Instant Search: The Complete User's Guide, Sep. 8, 2010, <URL: https://searchengineland.com/google-instant-complete-users-guide-50136>, retrieved Jul. 19, 2021, 11-pages.

Russell-Rose, "Designing Search: As-You-Type Suggestions," May 16, 2012, https://uxmag.com/articles/designing-search-as-you-type-suggestions. (Year: 2012).

* cited by examiner

METHOD AND SYSTEM FOR GENERATING REAL-TIME PERSONALIZED ADVERTISEMENTS IN DATA MANAGEMENT SELF-HELP SYSTEMS

BACKGROUND

Users of data management systems often develop questions regarding use of the data management systems or related to data management topics. Users can include users of stand-alone data management systems or users of software applications for which a data management system provides self-help support. Many data management systems implement social question-and-answer systems in which users can ask a question and other users, or experts associated with the data management system, can provide answers. The question, along with the answers that were provided, is saved and made available to other users of the data management system when they ask a similar question. Additionally, these questions and answers are made available to users via third-party web searches. Thus, large numbers of people access these question-and-answer services either from the data management systems or from web-based third-party search engines.

In spite of the large number of users that access the self-help question-and-answer services of data management systems, traditional data management systems do not adequately utilize the self-help question-and-answer services to assist users to find other services of the data management systems that will likely be useful to the users. For example, many traditional data management systems do not provide any promotional messaging content with self-help question-and-answer pages. This represents a missed opportunity to inform millions of users regarding valuable products and services provided by the data management systems.

On the other hand, some traditional data management systems provide a promotional message on question-and-answer pages. However, these traditional data management systems provide the same promotional message on each question-and-answer page. While this is an improvement over traditional data management systems that provide no promotional messaging at all, the static and inflexible promotional messages that are the same for all users and all question-and-answer pages still represent a gross underutilization of the opportunity to inform millions of users of valuable products and services provided by the data management systems.

One reason that traditional data management systems provide the same static promotional message on all question-and-answer pages for all users is because traditional data management systems are not able to overcome the technical difficulties in providing more useful and dynamic messaging in real time without simultaneously expending tremendous amounts of processing, memory, and communication bandwidth resources. When users access a question-and-answer page, traditional data management systems are unable to efficiently provide dynamic messaging in real time with the question-and-answer page.

Accordingly, there exists a technical problem of efficiently and effectively providing real time dynamic messaging to users of self-help question-and-answer services. What is needed is a system and method that can provide a technical solution to the technical problem of inefficient and inadequate self-help promotional messaging.

SUMMARY

Embodiments of the present disclosure provide one or more technical solutions to the technical problem of inefficient and inadequate promotional messaging with self-help services. Embodiments of the present disclosure provide a data management system including an assistance document database that can be accessed both by users of the data management system and by those that have not yet had any interaction with the data management system. The assistance document database includes a large number of assistance documents that provide assistance for various topics or issues related to the data management system. Embodiments of the present disclosure include a messaging content database having a large number of messages promoting various products and services of the data management system for various circumstances. Embodiments of the present disclosure train a predictive model with machine learning processes to probabilistically predict which type of message from the messaging database is most likely to be relevant to a user that accesses a particular assistance document. Thus, when a user accesses an assistance document, the predictive model matches the assistance document in real time to messaging content from the messaging content database. Embodiments of the present disclosure present personalized messaging content data including the selected promotional message with the assistance document in real time.

Embodiments of the present disclosure address some of the shortcomings associated with traditional data management systems that do not provide personalized messaging content to users of self-help services in real time. A data management system in accordance with one or more embodiments provides dynamically personalized messaging content in real time to users of a self-help service by utilizing machine learning to train a predictive model to quickly, efficiently, and accurately match assistance documents to appropriate messaging content. The data management system provides personalized messaging content data with the assistance documents in real-time.

Figure 1:
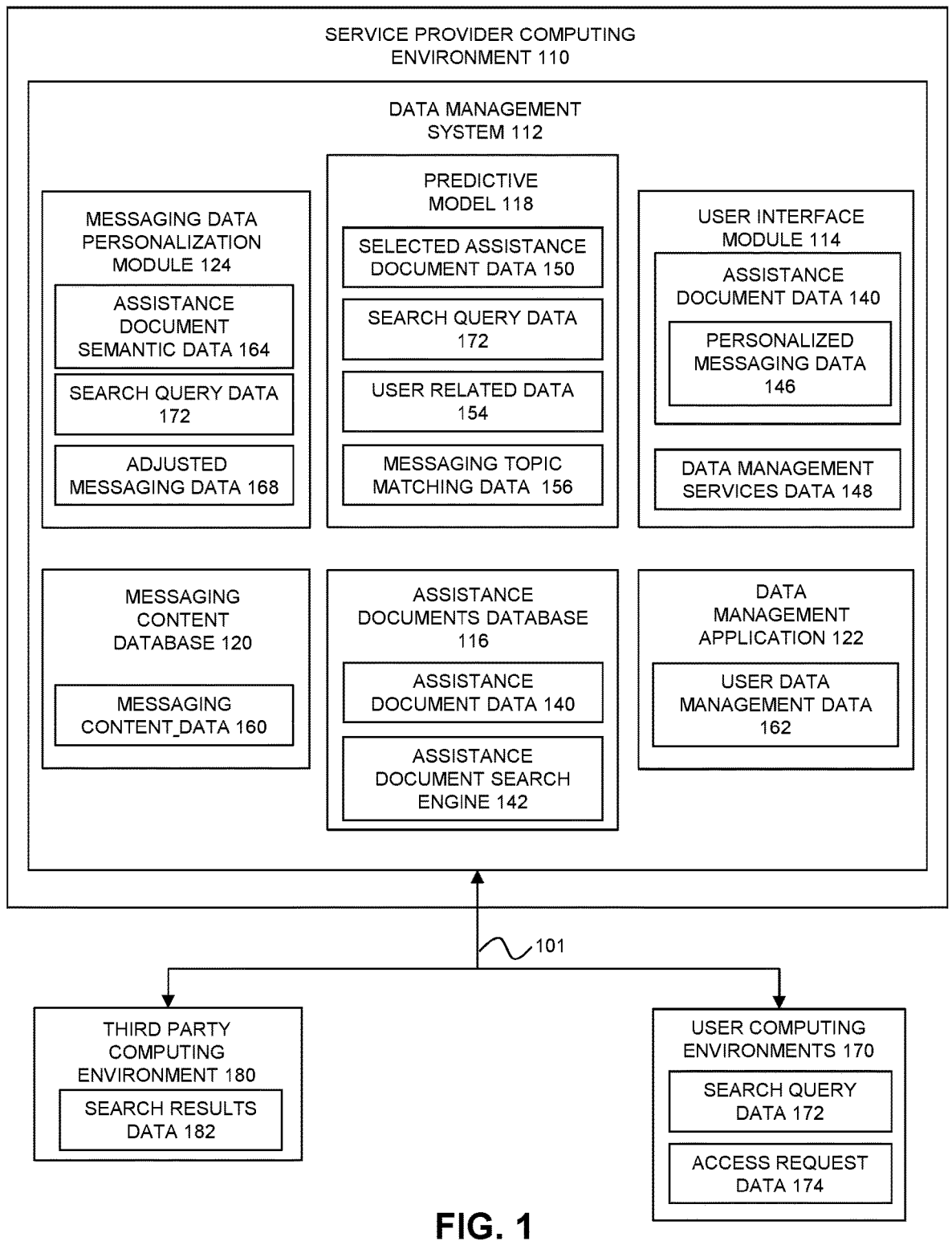
FIG. 1 is a block diagram of software architecture for providing real-time personalized messaging data to users of a self-help system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed tax return preparation system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the terms "interview" and "interview process" include, but are not limited to, an electronic, software-based, and/or automated delivery of multiple questions to a user and an electronic, software-based, and/or automated receipt of responses from the user to the questions, according to various embodiments.

As used herein, the terms messaging and messaging content include, but are not limited to, one or more of an advertisement, a banner advertisement, a message promoting a product or service, a self-help answer that includes a promotional message, and an email or text message sent to a customer or potential customer.

Embodiments of the present disclosure address some of the shortcomings associated with traditional data management systems that provide static and inadequate promotional messaging to users of a self-help service. A data management system in accordance with one or more embodiments provides dynamic personalized messaging with assistance documents in real time. The various embodiments of the disclosure can be implemented to improve the technical fields of data processing, data transmission, data analysis, promotional messaging, and data collection. Therefore, the various described embodiments of the disclosure and their associated benefits amount to significantly more than an abstract idea.

Using the disclosed embodiments of a method and system for providing real-time personalized messaging data to users of a self-help system, a method and system for providing real-time personalized messaging data to users of a self-help system is provided. Therefore, the disclosed embodiments provide a technical solution to the long standing technical problem of static, inefficient, and ineffective messaging in self-help systems.

In addition, the disclosed embodiments of a method and system for providing real-time personalized messaging data to users of a self-help system are also capable of dynamically adapting to constantly changing fields such as tax return preparation and other kinds of financial management. Consequently, the disclosed embodiments of a method and system for providing real-time personalized messaging data to users of a self-help system also provide a technical solution to the long standing technical problem of static and inflexible data management systems.

The result is a much more accurate, adaptable, and robust method and system for providing real-time personalized messaging data to users of a self-help system. This, in turn, results in: less human and processor resources being dedicated to providing personalized messaging content to users because more accurate and efficient analysis methods can be implemented, i.e., usage of fewer processing resources, usage of fewer memory storage assets, and less communication bandwidth being utilized to transmit data for analysis and consumption.

The disclosed method and system for providing real-time personalized messaging data to users of a self-help system does not encompass, embody, or preclude other forms of innovation in the area of electronic data management systems. In addition, the disclosed method and system for providing real-time personalized messaging data to users of a self-help system is not related to any fundamental economic practice, fundamental data processing practice, mental steps, or pen and paper based solutions, and is, in fact, directed to providing solutions to new and existing problems associated with electronic data management systems. Consequently, the disclosed method and system for providing real-time personalized messaging data to users of a self-help system, does not encompass, and is not merely, an abstract idea or concept.

Hardware Architecture

FIG. 1 illustrates a block diagram of a production environment 100 for providing real-time personalized messaging data to users of a self-help system, according to one embodiment. Embodiments of the present disclosure provide a data management system that provides data management services and products to users. The data management system provides a self-help service including an assistance documents database including a large number of assistance documents that each provide answers, solutions, or information related to questions associated with topics related to the data management system. The data management system includes a database of messaging content including a large number messages that can be provided with assistance documents accessed by users. The data management system includes a predictive model that has been trained with a machine learning process to match messages from the messaging content database to assistance documents. When a user accesses an assistance document, the predictive model matches the assistance document to a message from the messaging content database in real time. The data management system provides personalized messaging content data including the matched message in real time with the assistance documents accessed by the user. In this way, embodiments of the present disclosure provide personalized messaging content in real time to users of a self-help system.

In one embodiment, the personalized messaging content data promotes a product or service provided by the data management system. The personalized messaging content data is dynamically selected to promote a product or service that is likely to be valuable to the user. In one embodiment, the personalized messaging content data is a banner ad.

In one embodiment, the predictive model includes a Latent Dirichlet Allocation (LDA) topic model. The LDA topic model matches assistance documents to messaging content based on one or more of semantic data included in the assistance document, search query data by which the user found and accessed the assistance document, and characteristics of the user. In one embodiment, the LDA topic model is an unsupervised LDA topic model.

In one embodiment, the predictive model includes a multiclass classifier. The multiclass classifier is trained with a supervised machine learning process to classify assistance documents and thereby match them to messaging content. In one embodiment, the predictive model includes an uplift model.

In one embodiment, the predictive model includes both supervised and unsupervised learning. The unsupervised learning includes, in one embodiment, one or more of an LDA model, a probabilistic topic model, a clustering model, or other kinds of supervised learning. The supervised learning includes, in one embodiment, a multiclass classifier or another kind of supervised learning model.

In one embodiment, the data management system generates personalized messaging content data that mimics the search query data provided by the user. The personalized messaging content rephrases, at least partially, the search query or question.

In one embodiment, the data management system generates personalized messaging content data by personalizing one or more of writing style, color schemes, fonts, or other aspects of presentation of a self-help answer or a promotional message accompanying the self help answer.

In one embodiment, the data management system generates personalized messaging content with wording based on the user's writing style. Thus, the personalized messaging content data includes wording based on the style of wording used by the user.

In one embodiment, the data management system generates personalized messaging content based on user demographics and behavioral data, such as clickstream data. The personalized messaging content, in one embodiment, renders "Do It With me" and "Do It For Me" promotional messages in response to multiple clicks in the self-help system. In one embodiment, the data management system generates personalized messaging content based on financial characteristics of the user.

In one embodiment, the data management system is a financial management system. The financial management system provides financial management services to users of the financial management system. The financial management system provides financial management services including one or more of tax return preparation, budgeting assistance, financial transaction monitoring assistance, bookkeeping assistance, accounting assistance, wealth management assistance, and other kinds of financial management assistance, according to various embodiments.

In one embodiment, the financial management system presents a financial management interview to users by providing interview content data to the users. The interview content data guides a user through a series of financial topics, asks questions, and invites the user to provide data related to financial topics and questions.

In one embodiment, as users utilize the services of the data management system, it is common that users will have questions regarding some aspects of the data management system, or regarding laws or regulations related to the services of the data management system. In this case the users may utilize an assistance feature provided by the data management system. In one embodiment, users enter search queries into a search field of the data management system. The data management system then generates search results that may include several assistance documents related to the search queries. The users can select an assistance document from the search results and can read one or more answers or solutions related to the search queries.

In one embodiment, the data management system makes the various assistance documents available to users that have not yet accessed the data management services provided by the data management system. In particular, the data management system makes the self-help database, including the many assistance documents, available on the Internet for anybody to access. People may utilize a web browser to enter into a third-party search engine via a web browser a search query related to the services provided by the data management system. Among the search results returned by the third-party search engine are links to webpages corresponding to assistance documents from the assistance documents database provided by the data management system. People who are not yet users of the services of the data management system follow the links to the assistance documents provided by the data management system in order to find answers to their questions. In this way, people who are not yet users of the data management system access assistance documents provided by the data management system via a third-party search engine.

In one embodiment, the data management system advantageously utilizes the assistance documents to provide personalized messaging content inviting users to access one or more services of the data management system. The data management system generates personalized messaging content in real time directed toward the specific needs of the user that has accessed the assistance document and presents the personalized messaging content to the user together with the assistance document. Because the personalized messaging content is dynamically generated based on the perceived needs of the user, the user is much more likely to recognize the benefit of accessing the services of the data management system. If the user so desires, the user selects the personalized messaging content and the user is then provided with the opportunity to utilize services of the data management system. In this way, the data management system utilizes the assistance documents database to present to potential users of the data management system products and services of the data management system that the potential users can purchase or subscribe to.

In one embodiment, the data management system presents the personalized messaging data to current users of the data management system that accessed an assistance document from the data management system. The personalized messaging data includes personalized messaging content dynamically tailored toward the needs of the users. The personalized messaging data promotes products and services provided by the data management system that the user has not yet purchased.

In addition, the disclosed method and system for providing real-time personalized messaging data to users of a self-help system provides for significant improvements to the technical fields of data processing, data management, financial management, and user experience.

In addition, as discussed above, the disclosed method and system for providing real-time personalized messaging data to users of a self-help system provides for the processing and storing of smaller amounts of data, i.e., to more efficiently collect financial data from the user and provide a tax return preparation interview to the user; thereby eliminating unnecessary data analysis and storage. Consequently, using the disclosed method and system for providing real-time personalized messaging data to users of a self-help system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for providing real-time personalized messaging data to users of a self-help system.

The production environment 100 includes a service provider computing environment 110, a user computing environment 170, and a third-party computing environment 180 for providing real-time personalized messaging data to users of a self-help system, according to one embodiment. The computing environments 110, 170, and 180 are communicatively coupled to each other with one or more communication channels 101, according to one embodiment.

The service provider computing environment 110 represents one or more computing systems such as a server or a distribution center that is configured to receive, execute, and host one or more data management systems (e.g., applications) for access by one or more users, for providing real-time personalized messaging data to users that access a self-help service of the data management system, according to one embodiment. The service provider computing environment 110 represents a traditional data center computing environment, a virtual asset computing environment (e.g., a cloud computing environment), or a hybrid between a traditional data center computing environment and a virtual asset computing environment, according to various embodiments.

The service provider computing environment 110 includes a data management system, which is configured to provide data management services to users. The service provider computing environment 110 includes one or more processors configured to execute software instructions stored on one or more computer readable media to provide the functionality of the data management system 112, according to one embodiment.

According to one embodiment, the data management system 112 is a standalone system that provides data management services to a user. Alternatively, the data management system 112 is integrated into other software or service products provided by a service provider.

The data management system 112 provides data management services to users. The data management system 112 also provides self-help services to users, or potential users, of the data management system 112. The self-help system includes many assistance topics that users can access either from the data management system 112, or from a third-party web search. When a user accesses one of the assistance topics, the data management system 112 provides dynamic real-time personalized messaging data with the assistance topic. The real-time personalized messaging data includes, in one embodiment, personalized advertisements for products related to the data management system based on one or more of, the assistance topic accessed by the user, an assistance topic search query entered by the user, semantic data included in the assistance topic page, and a writing style used by the user in generating the search query. The data management system 112 includes various components, databases, engines, modules, and/or data to support providing data management services to a user, according to one embodiment.

As a specific example, in one embodiment, the data management system 112 includes a user interface module 114, an assistance documents database 116, a predictive model 118, a messaging content database 120, a data management application 122, and a messaging data personalization module 124, according to one embodiment.

In one embodiment, the assistance documents database 116 includes assistance document data 140. In one embodiment, the assistance document data 140 includes a plurality of assistance documents. The assistance documents include assistance topics as well as solutions to problems related to the assistance topics. Thus, each assistance document corresponds to an assistance topic with one or more solutions or answers related to the assistance topic.

In one embodiment, the assistance documents database 116 is a social question-and-answer database. In a social question-and-answer database, each assistance document corresponds to a question or search query provided by a user of the data management system 112. In the social question answer database, the answers or solutions to a search query made by a user are provided by other users of the data management system 112. A single assistance document can include multiple answers or solutions provided by various users of the social question-and-answer support system.

In one embodiment, an assistance document includes answers provided by regular users of the data management system 112, or by users that have been designated as trusted users of the data management system 112. Furthermore, in one embodiment, an assistance document includes answers provided by experts or other personnel associated with the data management system 112.

Many traditional data management systems do not utilize assistance documents databases to promote products and services of the traditional data management systems. In this way, traditional data management systems miss an opportunity to leverage the assistance documents database in order to notify users or potential users of the traditional data management systems of products or services of the traditional data management systems.

Other traditional data management systems may present a single static advertisement with an assistance document. In these traditional data management systems, the single static advertisement is the same for all users and for all assistance documents. Because the single static advertisement is the same for all users in all topics, the traditional data management systems fail to recruit users or potential users that would otherwise purchase products or services provided by the traditional data management systems.

In one embodiment, the data management system 112 includes a messaging content database 120. The messaging content database 120 includes messaging content data 160 related to a large number of messages that can be provided with assistance document data to those that access assistance document data 140 from the assistance documents database 116.

In one embodiment, the messaging content data 160 includes a large number of messages related to various services, products, or aspects of services and products provided by the data management system 112. Rather than including a single static advertisement each time a user accesses an assistance document, the messaging content data 160 includes a large variety of messages that can be served when a user accesses an assistance document from the assistance documents database 116. The messages in the messaging content data 160 are selected to appeal to a large variety of users and potential users of the data management system 112. Thus, the messages including the messaging content data 160 are directed to of various products and services, or aspects of products and services that will appeal to a variety of users.

In one embodiment, the messaging content data 160 includes advertisements for various products and services, or aspects of products and services provided by the data management system 112. Each advertisement promotes a product or service, or an aspect of a product or service provided by the data management system 112. As will be set forth in more detail below, the data management system 112 selects advertisements in a personalized manner for each user that accesses an assistance document from the assistance documents database 116 according to one embodiment.

In one embodiment, the data management system 112 utilizes the predictive model 118 to select a message from the messaging content database 120 to be provided with the contents from the assistance document data 140. In particular, when a user accesses an assistance document from the assistance documents database 116, the predictive model 118 analyzes characteristics associated with the user, the search query data 172, and the particular assistance document accessed by the user in order to determine a personalized message from the messaging content data 160 that can be provided to the user with the assistance document data 140.

In one embodiment, the predictive model 118 selects a message from the messaging content data 160 in real time when a user accesses an assistance document from the assistance documents database 116. Thus, when the data management system 112 retrieves an assistance document to be presented to a user, the predictive model 118 analyzes various characteristics related to the assistance document and the user and predicts what kind of message from the messaging content database 120 will be most relevant to the user and most likely to cause the user to access a promoted product or service of the data management system. The predictive model 118 retrieves an appropriate message from the messaging content database 120. The user interface module 114 presents the assistance document data 140 including personalized messaging data 146 corresponding to the message selected by the predictive model 118. All this happens in real time so that to the user, presentation of the assistance document data 140 and the personalized messaging data 146 is substantially simultaneous.

In one embodiment, the predictive model 118 generates messaging topic matching data 156. The messaging topic matching data 156 indicates what message, type of message, or topic of message from the messaging content data 160 is likely to be relevant to the user based on the characteristics of the assistance document data 140 accessed by the user, the characteristics of the user, and the characteristics of the search query entered by the user, according to various embodiments.

In one embodiment, when a user accesses an assistance document from the assistance documents database 116, the predictive model 118 retrieves selected assistance document data 150 related to the assistance document accessed by the user. The predictive model 118 analyzes the characteristics of the selected assistance document data 150 and predicts a type of message that is likely to be relevant to the user based on the characteristics of the assistance document selected by the user as indicated in the selected assistance document data 150.

Turning now to the user interface module 114, in one embodiment, the user interface module 114 enables users to access services of the data management system 112. The data management system 112 provides data management services to the users via the user interface module 114. The data management system 112 also provides self-help services to users via the user interface module 114. In one embodiment, the user interface module 114 includes resources of the data management system 112 that provide webpage data to users via web browsers utilized by the users. Additionally, or alternatively, in one embodiment the user interface module 114 includes resources of the data management system 112 that provide data management or self-help services to users via a dedicated software application accessed by the users.

In one embodiment, when current users of the data management system 112 access services of the data management system 112, the user interface module 114 provides data management services data 148 to the users. The data management services data 148 includes data management interview content, data management services, personal data of users, or other data provided by the data management system 112 to users of the data management system 112.

In one embodiment, the user interface module 114 presents assistance document data 140 to users of the data management system 112 and to potential users of the data management system 112. The assistance document data 140 includes personalized messaging data 146 in accordance with the messaging topic matching data 156 generated by the predictive model 118. Thus, the personalized messaging data 146 is presented to users simultaneously with the assistance document data 140, for example, on the same webpage or in the same screen presented with a software application associated with the data management system 112

In one embodiment, when potential users of the data management system 112 access an assistance document via a third-party search engine, the user interface module 114 provides the assistance document data to the potential users. In particular, the user interface module 114 provides webpage data corresponding to the assistance documents to potential users that select a search result associated with an assistance document returned by a third-party search engine in response to a search query made by the user, according to one embodiment.

In one embodiment, users and potential users of the data management system 112 access the services of the data management system 112 from user computing environments 170. The user computing environments 170 include devices and systems for which users will potential users access the data management system, or access assistance documents provided by the data management system. In one embodiment, the user computing environments include desktop computers, laptop computers, tablet computers, smart phones, cloud computing environments, personal electronic devices, and other computing devices or systems that enable users to access and execute software applications, according to various embodiments.

In one embodiment, users utilize the user computing environments 170 to enter search query data 172. The search query data 172 corresponds to a search for information related to services provided by the data management system 112. In an example in which the data management system 112 is a tax return preparation system, the search query data 172 includes a query for information related to the tax topics that is relevant to the user. The access request data 174 corresponds to the user selecting an assistance document from the search results data provided by the data management system 112. The data management system 112 receives the access request data 174 and provides the assistance document data 140 in response to receiving the access request data 174.

In one embodiment, the user enters a search query data 172 into a search engine provided by third-party via a third-party computing environment 180. In the example in which the data management system is a tax return preparation system, the user enters tax related search query data 172 into a third-party search engine. The third-party search engine executes a web search based on the search query data 172. The third-party search engine generates search results data 182. The search results data includes a list of webpages relevant to the search query data 172 provided by the user. Among the search results data 182 are links to webpages dedicated to or including assistance documents provided by the data management system 112. When the user selects a link to an assistance document webpage from the search results data 182, the data management system 112 provides assistance document data 140 to the user in a webpage including personalized messaging data 146.

Returning again to the predictive model 118, in one embodiment, the predictive model 118 retrieves selected assistance document data 150 when a user accesses an assistance document from the assistance documents database 116. The selected assistance document data includes characteristics of the assistance document selected by the user. The selected assistance document data 150 identifies, in one embodiment, one or more of a title of the assistance document accessed by the user, a topic of the assistance document accessed by the user, and an answer or solution included in the assistance document accessed by the user, according to various embodiments. The selected assistance document data 150 includes all or a portion of the assistance document accessed by the user, in one embodiment.

In one embodiment, the predictive model 118 analyzes the selected assistance document data 150 and generates messaging topic matching data 156 based on the selected assistance document data 150. The predictive model 118 generates the messaging topic matching data 156 based on the characteristics of the assistance document as indicated by the selected assistance document data 150.

In one embodiment, the predictive model 118 does not have access to the search query data 172 that the user entered in order to eventually access the assistance document. For example, if the user enters search query data 172 into a third-party search engine via a web browser, the data management system 112 will not know exactly the search query data 172 indicated. However, when the user selects an assistance document from the search results data 182 returned by the third-party search engine, the predictive model 118 is able to predict the search query that was provided by the user. The predictive model 118 generates messaging topic matching data 156 based on the analysis of the selected assistance document data 150. The messaging topic matching data 156 indicates or kind of message or topic is likely to be relevant to the user based on the assistance document accessed by the user.

In one embodiment, the user accesses the assistance documents database 116 via the data management system 112. In this case, while the user is interfacing with the data management system 112, the user provides search query data 172 to the data management system 112. The assistance document search engine 142 of the assistance documents database 116 retrieves one or more assistance documents from the assistance documents database 116. The user selects an assistance document from the search results returned by the assistance document search engine 142.

In one embodiment, when the user searches for an assistance document by interfacing with the data management system 112, the predictive model 118 retrieves or receives search query data 172 corresponding to the search query provided by the user to the data management system 112. The predictive model 118 analyzes the search query data 172. The predictive model 118 generates messaging topic matching data 156 based on the analysis of the search query data 172. The messaging topic matching data 156 indicates a type of message or topic that is likely to be relevant to the user based on the search query data 172. The user interface module 114 provides personalized messaging data 146 to the user together with the assistance document data 140 accessed by the user. In this way, the predictive model 118 assists the data management system 112 to provide personalized messaging data 146 to the user with the assistance document data 140 accessed by the user, according to one embodiment.

In one embodiment, the predictive model 118 accesses, retrieves, or receives user related data 154 when the user accesses an assistance documents from the assistance documents database 116. The user related data 154 indicates characteristics of the user. In one embodiment, the user related data 154 includes data provided by the user to the data management system 112 as part of the services provided by the data management system 112 to the user. In one embodiment, the user related data 154 includes data retrieved by the data management system 112 related to the user in the course of providing data management services to the user.

In one embodiment, the user may also switch from using a search function of the data management system 112 to using a third-party search function, for example, by opening a separate window or tab in a web browser. In this case, the user's click stream data will be easily available for the data management system 112. This click stream data can be used by the data management system to make a more accurate prediction with the predictive model 118, as is set forth in more detail below.

In one embodiment, the user related data 154 includes data indicating interactions of the user with the data management system. These interactions can include selections made by the user while utilizing data management services, previous requests for assistance, previous products or services utilized by the user, whether or not the user tends to require a large amount of assistance, whether or not the user tends to prefer performing tasks without assistance, and other kinds of interactions of the user with the data management system, according to various embodiments.

In one embodiment, the user related data 154 includes demographic data related to the user. In one embodiment the demographic data includes one or more of a geolocation of the user, an age of the user, a gender of the user, a marital status of the user, data related to dependents of the user, and other kinds of demographic data according to various embodiments.

In one embodiment, the user related data 154 includes financial related data of the user. The financial related data includes financial data received from the user or retrieved for the user to provide financial management services to the user. The financial related data includes information, such as, but not limited to, a name of the user, a name of the user's employer, an employer identification number (ED), a job title, annual income, salary and wages, bonuses, a government identification, a driver's license number, a date of birth, an address, a zip code, home ownership status, marital status, W-2 income, an employer's address, spousal information, children's information, asset information, medical history, occupational information, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a tax return preparation system or in the preparation of financial documents such as a user's tax return, according to various embodiments.

In one embodiment, the predictive model 118 analyzes the user related data 154 in order to generate messaging topic matching data 156. The predictive model 118 identifies messaging data that is likely to be relevant to the user based on the user related data 154. In this way, the data management system 112 utilizes the user related data 154 in order to provide personalized messaging data 146 to the user, according to one embodiment.

In one embodiment, the predictive model 118 the data management system trains the predictive model 118 with one or more machine learning training processes. The machine learning training processes train the predictive model 118 to execute one or more algorithms to reliably identify messaging content from the messaging content database 120 that is likely to be relevant to the user that has accessed an assistance document from the assistance documents database 116. In one embodiment, the predictive model 118 is trained with a supervised machine learning process. In one embodiment, the predictive model 118 is trained with an unsupervised machine learning process.

In one embodiment, the predictive model includes a multiclass classifier. The multiclass classifier is trained with a supervised machine learning process to correctly match assistance documents to messaging content in the messaging content database 120. The supervised machine learning process trains the multiclass classifier model with training set data that includes assistance documents and messaging content data that are known to be matches. The multiclass classifier model is trained iteratively until the multiclass classifier model can reliably match assistance documents to messaging content data.

In one embodiment, the predictive model includes a Latent Dirichlet Allocation (LDA) model to match the assistance documents accessed by a user to messaging content included in the messaging content database 120. The LDA model utilizes natural language processing to analyze the text included in the assistance document and matches the assistance document to messaging content included in the messaging content database 120.

In one embodiment, the LDA model is trained with an unsupervised machine learning process. In the unsupervised machine learning process, the LDA model is trained to match assistance documents to messaging content for which matches are not known before-hand.

In one embodiment, the machine learning process includes collecting success metrics on the effectiveness of the messages that are provided to people that access the assistance document database. This data is then used to train an uplift model that predicts whether personalization of messaging content is more likely to cause a user to click on the message or to otherwise access products or services provided by the messaging content.

In one embodiment, the predictive model 118 is implemented in conjunction with a cloud platform service provider. In one embodiment, the predictive model is used as an application programming interface (API) for the assistance documents database 116. The predictive model 118 can generate messaging topic matching data 156 and provide personalized messaging data 146 with the assistance document data 140 associated with the selected assistance document. In one embodiment, the predictive model 118 is implemented with Amazon Web Services (AWS) lambda. In one embodiment, the predictive model 118 is deployed in the cloud.

In one embodiment, the predictive model 118 includes an uplift model. The uplift model is a predictive model that utilizes decision trees and regression analysis to predict messaging content data 160 that is likely to be relevant to the user that has accessed the assistance document.

In one embodiment, the data management system 112 is a tax return preparation system. A user that is a farmer accesses an assistance document from the assistance documents database 116. The assistance document is related to tax issues faced by farmers. The predictive model 118 analyzes one or more of the selected assistance document data 150, the search query data 172, and the user related data 154. The predictive model 118 generates messaging topic matching data 156 matching the assistance document to messaging content from the messaging content database 120. The matched messaging content promotes a tax return preparation product or service that is suited for tax situations encountered by farmers and includes messaging indicating that the product or service is directed to farmers. The data management system 112 provides personalized messaging data 146 including the selected messaging content with the assistance document data 140 in real time. The user is likely to recognize the value of the promoted product or service to the user. The user is likely to purchase or utilize the promoted product or service. Both the user and the data management system benefit from this.

In one embodiment, the data management system 112 utilizes the messaging data personalization module 124 to further adjust messaging data selected from the messaging content database 120 by the predictive model 118 before providing the personalized messaging data 146. When a type of messaging content has been selected from the messaging content database 120, the messaging data personalization module 124 further adjusts the messaging data in a manner selected to enhance the likelihood that the user will recognize the value of the product or service promoted in the personalized messaging data 146 presented with the assistance document data 140.

In one embodiment, the messaging data personalization module 124 receives assistance document semantic data 164 one a user accesses an assistance document from the assistance documents database 116. The assistance document semantic data 164 includes semantic data from the assistance document. The semantic data includes the wording of the assistance document topic or title that the user selected. The messaging data personalization module 124 analyzes the assistance document semantic data 164 and generates adjusted messaging data 168 by adjusting messaging content from the messaging content database 120 to include or mimic the wording or style of the assistance document accessed by the user. The user likely selected the assistance document because the user found the assistance documents relevant due to the wording in the title or description of the assistance document. By adjusting the messaging content to mimic the wording or style of the title or description of the assistance document, the user is more likely to recognize the value of the product or service promoted by the messaging content.

In one embodiment, the data management system 112 is a tax return preparation system and the assistance documents database 116 includes a plurality of assistance documents related to tax related questions of users. A user that is a small business owner generates search query data 172 either in a search engine of the data management system 112 or with a third-party web search engine. The search results include an assistance document with a title "Tax Solutions For Small Business Owners", which the user selects. The predictive model 118 analyzes the assistance document in real-time and matches messaging content from the messaging content database 120 to the assistance document. The messaging data personalization module 124 analyzes the assistance document semantic data 164 associated with the assistance document and generates adjusted messaging data 168. The adjusted messaging data 168 includes an adjustment to the messaging content selected from the messaging content database 120. In particular, the adjusted messaging data 168 includes the text "Tax Solutions For Small Business Owners". The data management system 112 provides the personalized messaging data 146 including, or based on, the adjusted messaging data 168 with the assistance document data 140 accessed by the user. Because the personalized messaging data 146 closely matches the title of the assistance document accessed by the user, the user is more likely to access or select the product or service promoted by the personalized messaging data 146.

In one embodiment, messaging data personalization module 124 receives search query data 172 related to the search query generated by the user and based on which the user located and selected the assistance document. The messaging data personalization module 124 analyzes the search query data and generates adjusted messaging data 168 based on the search query data 172. The messaging data personalization module 124 generates the adjusted messaging data 168 by adjusting messaging content selected from the messaging content database 120 based on the search query data 172 so that the user is more likely to recognize the value of the product or services promoted in the personalized messaging data 146.

In one embodiment, the messaging data personalization module 124 generates the adjusted messaging data 168 by identifying a writing style of the user based on the search query data 172. Because the search query data 172 includes a string of words typed or otherwise provided by the user, the messaging data personalization module 124 is able to analyze the search query data 172 and identify a writing style of the user. The messaging data personalization module 124 generates adjusted messaging data 168 by rewording messaging content from the messaging content database 120 in a manner that mimics the writing style of the user. The user is more likely to notice and recognize the value of services or products promoted by the personalized messaging data 146 if the personalized messaging data 146 is presented in a style that is familiar or pleasing to the user, such as the user's own writing style.

In an example, in accordance with one embodiment, in which the data management system 112 is a tax return preparation system and the assistance documents database 116 includes a plurality of assistance documents related to tax related questions of users, a user that is a member of the military enters search query data 172 with the wording "How does being in the military affect my taxes?". The assistance document search engine 142 generates search results for the user including several assistance documents from the assistance documents database 116. The user selects an assistance document from the search results. The predictive model 118 analyzes the assistance document and/or the search query data 172 and matches the messaging content from the messaging content database 120 to the assistance document. The messaging data personalization module 124 analyzes the search query data 172 and generates adjusted messaging data 168. The adjusted messaging data 168 includes an adjustment to the messaging content selected from the messaging content database 120. In particular, the adjusted messaging data 168 includes the text "How does being the military affect your taxes? We can help". The data management system 112 provides the personalized messaging data 146 in accordance with the adjusted messaging data 168 with the assistance document data 140 accessed by the user. Because the personalized messaging data 146 closely matches the user's own query, the user is more likely to access or select the product or service promoted by the personalized messaging data 146.

In one embodiment, the messaging data personalization module 124 messaging data personalization module 124 generates adjusted messaging data 168 by adjusting messaging content selected from the messaging content database 120 in accordance with the messaging topic matching data 156 generated by the predictive model 118. The adjusted messaging data 168 corresponds to messaging content selected from the messaging content database that has been revised by the messaging data personalization module 124 in order to enhance the likelihood that the user will recognize the value in the product or service promoted by the messaging content.

Process

Figure 2:
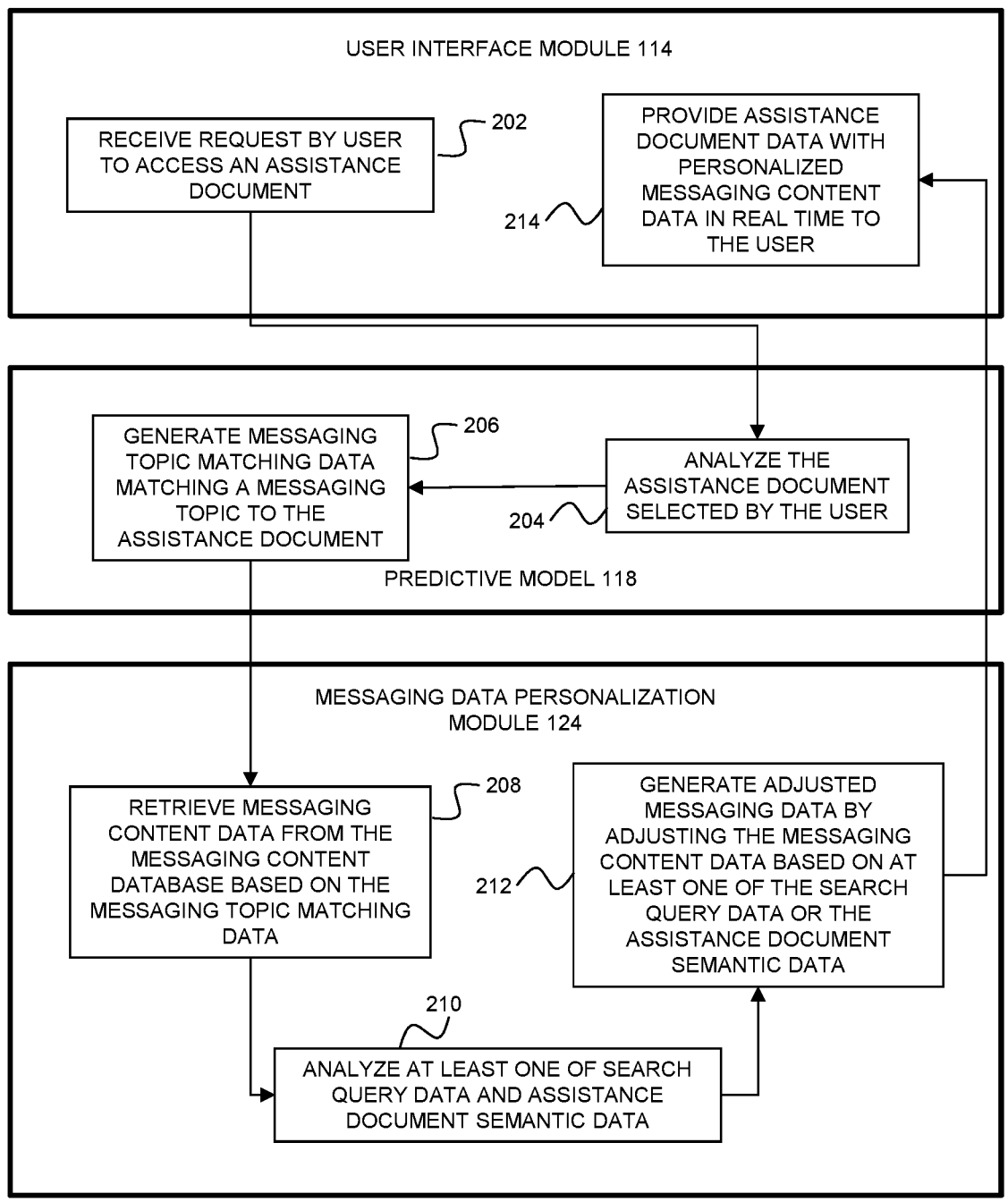
FIG. 2 is a block diagram of a process for providing real-time personalized messaging data to users of a self-help system, in accordance with one embodiment.

FIG. 2 illustrates a functional flow diagram of a process 200 for providing real-time personalized messaging data to users of a self-help system, in accordance with one embodiment.

Referring to FIG. 2, FIG. 1, and the descriptions of FIG. 1 above, at block 202, a user interface module 114 receives a request from a user to access an assistance document, using any of the methods, processes, and procedures discussed above with respect to FIG. 1, according to one embodiment. From block 202, the process proceeds to block 204.

At block 204, a predictive model 118 analyzes the assistance document selected by the user, using any of the methods, processes, and procedures discussed above with respect to FIG. 1, according to one embodiment. From block 204, the process proceeds to block 206.

At block 206, the predictive model 118 generates messaging topic matching data matching a messaging topic to the assistance document, using any of the methods, processes, and procedures discussed above with respect to FIG. 1, according to one embodiment. From block 206, the process proceeds to block 208 or to sub-process 254.

At block 208, a messaging data personalization module 124 retrieves messaging content data from the messaging content database based on the messaging topic matching data, using any of the methods, processes, and procedures discussed above with respect to FIG. 1, according to one embodiment. From block 208, the process proceeds to block 210.

At block 210, the messaging data personalization module 124 analyzes at least one of search query data and assistance document semantic data, using any of the methods, processes, and procedures discussed above with respect to FIG. 1, according to one embodiment. From block 210, the process proceeds to block 212.

At block 212, the messaging data personalization module 124 generates adjusted messaging data by adjusting the messaging content data based on at least one of the search query data or the assistance document semantic data, using any of the methods, processes, and procedures discussed above with respect to FIG. 1, according to one embodiment. From block 212, the process proceeds to block 214.

At block 214, the user interface module 114 provides assistance document data with personalized messaging content data in real time to the user using any of the methods, processes, and procedures discussed above with respect to FIG. 1, according to one embodiment.

Although a particular sequence is described herein for the execution of the process 200, other sequences can also be implemented, including fewer steps or more steps.

Figure 3:
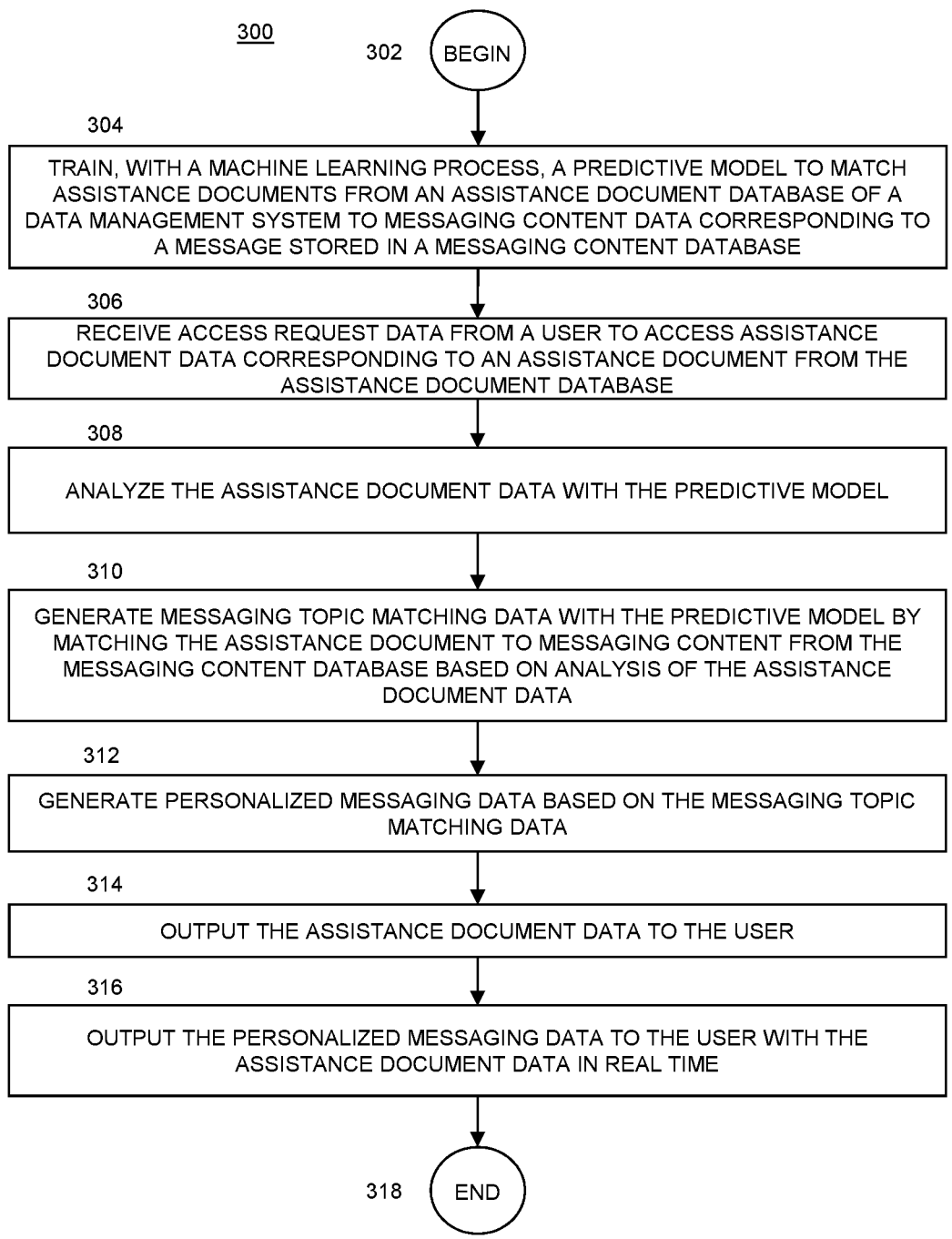
FIG. 3 is a flow diagram of a process for providing real-time personalized messaging data to users of a self-help system, in accordance with one embodiment.

FIG. 3 illustrates a flow diagram of a process 300 for providing real-time personalized messaging data to users of a self-help system, according to various embodiments.

Referring to FIG. 3, FIG. 1, and the description of FIG. 1 above, in one embodiment, process 300 begins at BEGIN 302 and process flow proceeds to TRAIN, WITH A MACHINE LEARNING PROCESS, A PREDICTIVE MODEL TO MATCH ASSISTANCE DOCUMENTS FROM AN ASSISTANCE DOCUMENT DATABASE OF A DATA MANAGEMENT SYSTEM TO MESSAGING CONTENT DATA CORRESPONDING TO A MESSAGE STORED IN A MESSAGING CONTENT DATABASE.

In one embodiment, at TRAIN, WITH A MACHINE LEARNING PROCESS, A PREDICTIVE MODEL TO MATCH ASSISTANCE DOCUMENTS FROM AN ASSISTANCE DOCUMENT DATABASE OF A DATA MANAGEMENT SYSTEM TO MESSAGING CONTENT DATA CORRESPONDING TO A MESSAGE STORED IN A MESSAGING CONTENT DATABASE 304 process 300 trains, with a machine learning process, a predictive model to match assistance documents from an assistance document database of a data management system to messaging content data corresponding to a message stored in a messaging content database, using any of the methods, processes, and procedures discussed above with respect to FIG. 1.

In one embodiment, once the predictive model is trained, with a machine learning process, to match assistance documents from an assistance document database of a data management system to messaging content data corresponding to a message stored in a messaging content database at TRAIN, WITH A MACHINE LEARNING PROCESS, A PREDICTIVE MODEL TO MATCH ASSISTANCE DOCUMENTS FROM AN ASSISTANCE DOCUMENT DATABASE OF A DATA MANAGEMENT SYSTEM TO MESSAGING CONTENT DATA CORRESPONDING TO A MESSAGE STORED IN A MESSAGING CONTENT DATABASE 304 process flow proceeds to RECEIVE ACCESS REQUEST DATA FROM A USER TO ACCESS ASSISTANCE DOCUMENT DATA CORRESPONDING TO AN ASSISTANCE DOCUMENT FROM THE ASSISTANCE DOCUMENT DATABASE 306.

In one embodiment, at RECEIVE ACCESS REQUEST DATA FROM A USER TO ACCESS ASSISTANCE DOCUMENT DATA CORRESPONDING TO AN ASSISTANCE DOCUMENT FROM THE ASSISTANCE DOCUMENT DATABASE 306, process 300 receives access request data from a user to access assistance document data corresponding to an assistance document from the assistance document database, using any of the methods, processes, and procedures discussed above with respect to FIG. 1.

In one embodiment, once access request data is received from a user to access assistance document data corresponding to an assistance document from the assistance document database at RECEIVE ACCESS REQUEST DATA FROM A USER TO ACCESS ASSISTANCE DOCUMENT DATA CORRESPONDING TO AN ASSISTANCE DOCUMENT FROM THE ASSISTANCE DOCUMENT DATABASE 306, process flow proceeds to ANALYZE THE ASSISTANCE DOCUMENT DATA WITH THE PREDICTIVE MODEL 308.

In one embodiment, at ANALYZE THE ASSISTANCE DOCUMENT DATA WITH THE PREDICTIVE MODEL 308, process 300 analyzes the assistance document data with the predictive model, using any of the methods, processes, and procedures discussed above with respect to FIG. 1.

In one embodiment, once the assistance document data is analyzed with the predictive model at ANALYZE THE ASSISTANCE DOCUMENT DATA WITH THE PREDICTIVE MODEL 308, process flow proceeds to GENERATE MESSAGING TOPIC MATCHING DATA WITH THE PREDICTIVE MODEL BY MATCHING THE ASSISTANCE DOCUMENT TO MESSAGING CONTENT FROM THE MESSAGING CONTENT DATABASE BASED ON ANALYSIS OF THE ASSISTANCE DOCUMENT DATA 310.

In one embodiment, at GENERATE MESSAGING TOPIC MATCHING DATA WITH THE PREDICTIVE MODEL BY MATCHING THE ASSISTANCE DOCUMENT TO MESSAGING CONTENT FROM THE MESSAGING CONTENT DATABASE BASED ON ANALYSIS OF THE ASSISTANCE DOCUMENT DATA 310 the process 300 generates messaging topic matching data with the predictive model by matching the assistance document to messaging content from the messaging content database based on analysis of the assistance document data, using any of the methods, processes, and procedures discussed above with respect to FIG. 1.

In one embodiment, once messaging topic matching data is generated with the predictive model by matching the assistance document to messaging content from the messaging content database based on analysis of the assistance document data at GENERATE MESSAGING TOPIC MATCHING DATA WITH THE PREDICTIVE MODEL BY MATCHING THE ASSISTANCE DOCUMENT TO MESSAGING CONTENT FROM THE MESSAGING CONTENT DATABASE BASED ON ANALYSIS OF THE ASSISTANCE DOCUMENT DATA 310, process flow proceeds to GENERATE PERSONALIZED MESSAGING DATA BASED ON THE MESSAGING TOPIC MATCHING DATA 312.

In one embodiment, at GENERATE PERSONALIZED MESSAGING DATA BASED ON THE MESSAGING TOPIC MATCHING DATA 312 the process 300 generates personalized messaging data based on the messaging topic matching data, using any of the methods, processes, and procedures discussed above with respect to FIG. 1.

In one embodiment, once personalized messaging data is generated based on the messaging topic matching data at GENERATE PERSONALIZED MESSAGING DATA BASED ON THE MESSAGING TOPIC MATCHING DATA 312, process flow proceeds to OUTPUT THE ASSISTANCE DOCUMENT DATA TO THE USER 314.

In one embodiment, at OUTPUT THE ASSISTANCE DOCUMENT DATA TO THE USER 314 the process 300 outputs the assistance document data to the user, using any of the methods, processes, and procedures discussed above with respect to FIG. 1.

In one embodiment, once the assistance document data is output to the user at OUTPUT THE ASSISTANCE DOCUMENT DATA TO THE USER 314, process flow proceeds to OUTPUT THE PERSONALIZED MESSAGING DATA TO THE USER WITH THE ASSISTANCE DOCUMENT DATA IN REAL TIME 316.

In one embodiment, at OUTPUT THE PERSONALIZED MESSAGING DATA TO THE USER WITH THE ASSISTANCE DOCUMENT DATA IN REAL TIME 316 the process 300 outputs the personalized messaging data to the user with the assistance document data in real time, using any of the methods, processes, and procedures discussed above with respect to FIG. 1.

In one embodiment, once the personalized messaging data is output to the user with the assistance document data in real time at OUTPUT THE PERSONALIZED MESSAGING DATA TO THE USER WITH THE ASSISTANCE DOCUMENT DATA IN REAL TIME 316, process flow proceeds to END 318.

In one embodiment, at END 318 the process 300 for providing real-time personalized messaging data to users of a self-help system is exited to await new data and/or instructions.

Figure 4:
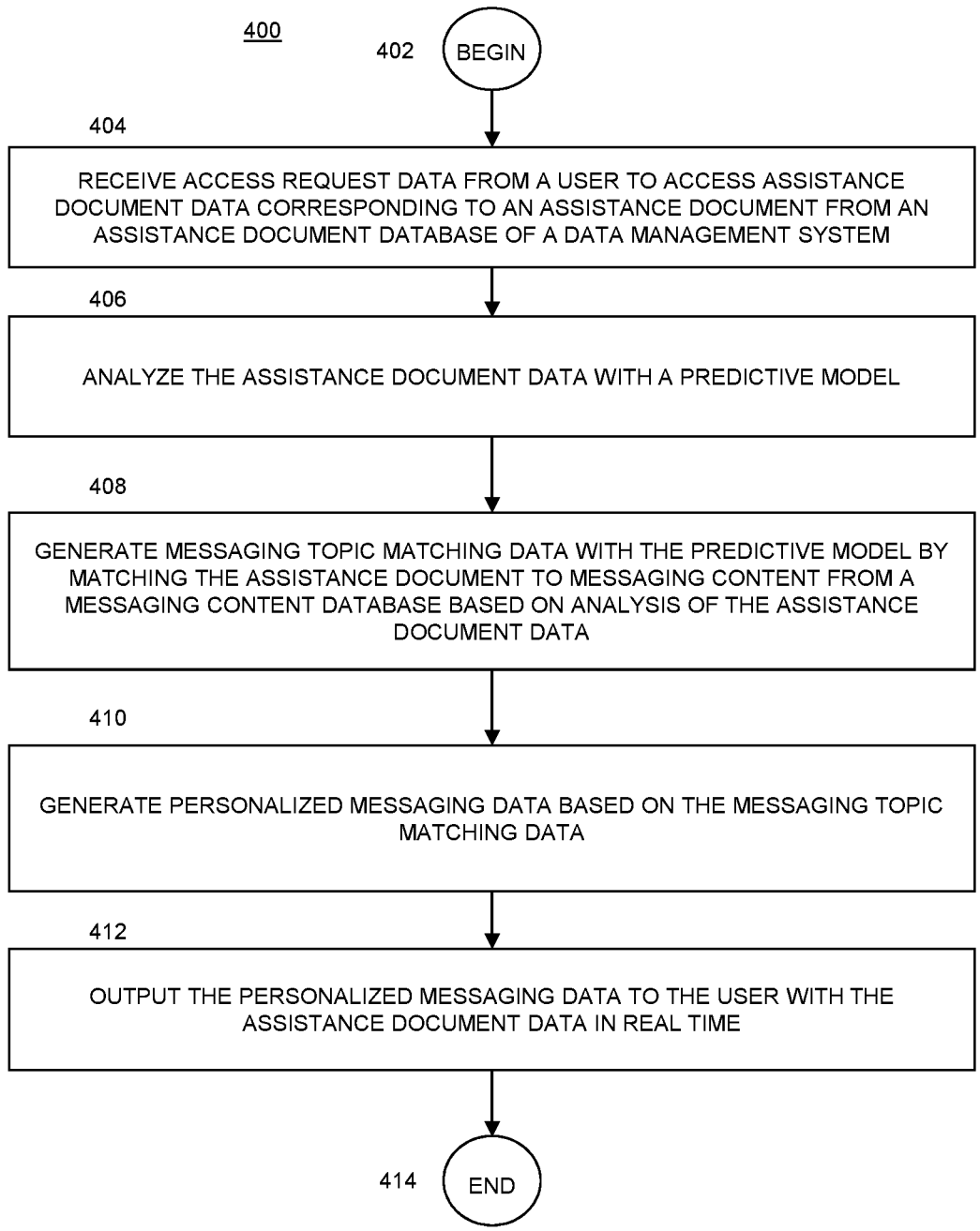
FIG. 4 is a flow diagram of a process for providing real-time personalized messaging data to users of a self-help system, in accordance with one embodiment.

FIG. 4 illustrates a flow diagram of a process 400 for providing real-time personalized messaging data to users of a self-help system, according to various embodiments.

Referring to FIG. 4, FIG. 1, and the description of FIG. 1 above, in one embodiment, process 400 begins at BEGIN 402 and process flow proceeds to RECEIVE ACCESS REQUEST DATA FROM A USER TO ACCESS ASSISTANCE DOCUMENT DATA CORRESPONDING TO AN ASSISTANCE DOCUMENT FROM AN ASSISTANCE DOCUMENT DATABASE OF A DATA MANAGEMENT SYSTEM 404.

In one embodiment, at RECEIVE ACCESS REQUEST DATA FROM A USER TO ACCESS ASSISTANCE DOCUMENT DATA CORRESPONDING TO AN ASSISTANCE DOCUMENT FROM AN ASSISTANCE DOCUMENT DATABASE OF A DATA MANAGEMENT SYSTEM 404 process 400 receives access request data from a user to access assistance document data corresponding to an assistance document from an assistance document database of a data management system, using any of the methods, processes, and procedures discussed above with respect to FIG. 1.

In one embodiment, once access request data is received from a user to access assistance document data corresponding to an assistance document from an assistance document database of a data management system at RECEIVE ACCESS REQUEST DATA FROM A USER TO ACCESS ASSISTANCE DOCUMENT DATA CORRESPONDING TO AN ASSISTANCE DOCUMENT FROM AN ASSISTANCE DOCUMENT DATABASE OF A DATA MANAGEMENT SYSTEM 404 process flow proceeds to ANALYZE THE ASSISTANCE DOCUMENT DATA WITH A PREDICTIVE MODEL 406.

In one embodiment, at ANALYZE THE ASSISTANCE DOCUMENT DATA WITH A PREDICTIVE MODEL 406, process 400 analyzes the assistance document data with a predictive model, using any of the methods, processes, and procedures discussed above with respect to FIG. 1.

In one embodiment, once the assistance document data is analyzed with a predictive model at ANALYZE THE ASSISTANCE DOCUMENT DATA WITH A PREDICTIVE MODEL 406, process flow proceeds to GENERATE MESSAGING TOPIC MATCHING DATA WITH THE PREDICTIVE MODEL BY MATCHING THE ASSISTANCE DOCUMENT TO MESSAGING CONTENT FROM A MESSAGING CONTENT DATABASE BASED ON ANALYSIS OF THE ASSISTANCE DOCUMENT DATA 408.

In one embodiment, at GENERATE MESSAGING TOPIC MATCHING DATA WITH THE PREDICTIVE MODEL BY MATCHING THE ASSISTANCE DOCUMENT TO MESSAGING CONTENT FROM A MESSAGING CONTENT DATABASE BASED ON ANALYSIS OF THE ASSISTANCE DOCUMENT DATA 408, process 400 generates messaging topic matching data with the predictive model by matching the assistance document to messaging content from a messaging content database based on analysis of the assistance document data, using any of the methods, processes, and procedures discussed above with respect to FIG. 1.

In one embodiment, once messaging topic matching data is generated with the predictive model by matching the assistance document to messaging content from a messaging content database based on analysis of the assistance document data at GENERATE MESSAGING TOPIC MATCHING DATA WITH THE PREDICTIVE MODEL BY MATCHING THE ASSISTANCE DOCUMENT TO MESSAGING CONTENT FROM A MESSAGING CONTENT DATABASE BASED ON ANALYSIS OF THE ASSISTANCE DOCUMENT DATA 408, process flow proceeds to GENERATE PERSONALIZED MESSAGING DATA BASED ON THE MESSAGING TOPIC MATCHING DATA 410.

In one embodiment, at GENERATE PERSONALIZED MESSAGING DATA BASED ON THE MESSAGING TOPIC MATCHING DATA 410 the process 400 generates personalized messaging data based on the messaging topic matching data, using any of the methods, processes, and procedures discussed above with respect to FIG. 1.

In one embodiment, once personalized messaging data is generated based on the messaging topic matching data at GENERATE PERSONALIZED MESSAGING DATA BASED ON THE MESSAGING TOPIC MATCHING DATA 410, process flow proceeds to OUTPUT THE PER- SONALIZED MESSAGING DATA TO THE USER WITH THE ASSISTANCE DOCUMENT DATA IN REAL TIME 412.

In one embodiment, at OUTPUT THE PERSONALIZED MESSAGING DATA TO THE USER WITH THE ASSISTANCE DOCUMENT DATA IN REAL TIME 412 the process 400 outputs the personalized messaging data to the user with the assistance document data in real time, using any of the methods, processes, and procedures discussed above with respect to FIG. 1.

In one embodiment, once the personalized messaging data is output to the user with the assistance document data in real time at OUTPUT THE PERSONALIZED MESSAGING DATA TO THE USER WITH THE ASSISTANCE DOCUMENT DATA IN REAL TIME 412, process flow proceeds to END 414.

In one embodiment, at END 414 the process 400 for providing real-time personalized messaging data to users of a self-help system is exited to await new data and/or instructions.

As noted above, the specific illustrative examples discussed above are but illustrative examples of implementations of embodiments of the method or process for providing a tax refund confidence indicator to a user. Those of skill in the art will readily recognize that other implementations and embodiments are possible. Therefore, the discussion above should not be construed as a limitation on the claims provided below.

In one embodiment, a system for providing real-time personalized messaging data to users of a self-help system includes at least one processor and at least one memory coupled to the at least one processor. The at least one memory has stored therein instructions which, when executed by any set of the one or more processors provides a data management system that performs a process including training, with a machine learning process, a predictive model to match assistance documents from an assistance document database of the data management system to messaging content data corresponding to a message stored in a messaging content database. The process includes receiving access request data from a user to access assistance topic data corresponding to an assistance topic from the assistance document database, analyzing the assistance document data with the predictive model, and generating messaging topic matching data with the predictive model by matching the assistance document to messaging content from the messaging content database based on analysis of the assistance document data. The process includes generating personalized messaging data based on the messaging topic matching data, outputting the assistance document data to the user, and outputting the personalized messaging data to the user with the assistance document data in real time.

In one embodiment, a computing system implemented method for providing real-time personalized messaging data to users of a self-help system includes training, with a machine learning process, a predictive model to match assistance documents from an assistance document database of a data management system to messaging content data corresponding to a message stored in a messaging content database. The method includes receiving access request data from a user to access assistance document data corresponding to an assistance document from the assistance document database, analyzing the assistance document data with the predictive model, and generating messaging topic matching data with the predictive model by matching the assistance document to messaging content from the messaging content database based on analysis of the assistance document data. The method includes generating personalized messaging data based on the messaging topic matching data, outputting the assistance document data to the user, and outputting the personalized messaging data to the user with the assistance document data in real time.

In one embodiment, a computing system implemented method for providing real-time personalized messaging data to users of a self-help system includes training, with a machine learning process, a predictive model to match a user of a data management system to messaging content data corresponding to a message stored in a messaging content database of the data management system. The method includes receiving, from a user, search query data including a request for assistance related to the data management system, outputting search results data to the user based on the search query data, and receiving selection data from the user selecting, from the search results data, assistance document data corresponding to an assistance document from an assistance document database. The method includes analyzing the search query data with the predictive model, generating messaging topic matching data with the predictive model by matching the user to messaging content data from the messaging content database based on analysis of the search query data, and generating personalized messaging data based on the messaging topic matching data. The method includes outputting the assistance document data to the user and outputting the personalized messaging data to the user with the assistance document data in real time.

In one embodiment, a system for providing real-time personalized messaging data to users of a self-help system includes at least one processor and at least one memory coupled to the at least one processor. The at least one memory has stored therein instructions which, when executed by any set of the one or more processors provides a data management system that performs a process including receiving access request data from a user to access assistance document data corresponding to an assistance document from an assistance document database of the data management system. The process includes analyzing the assistance document data with a predictive model, generating messaging topic matching data with the predictive model by matching the assistance document to messaging content from a messaging content database based on analysis of the assistance document data, and generating personalized messaging data based on the messaging topic matching data. The method includes outputting the personalized messaging data to the user with the assistance document data in real time.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system comprising:
   at least one processor; and
   at least one memory storing instructions that, when executed by the at least one processor, cause the system to:
   train, with one or more machine learning processes, a predictive model to match assistance documents from an assistance document database of a financial management system to messaging content stored in a messaging content database, wherein the predictive model includes at least a Latent Dirichlet Allocation model and an uplift model;

receive user related data including at least demographic data related to a user and financial data related to the user;

receive a search query from the user for information regarding one or more topics associated with the financial management system;

receive, based on the search query, an access request from the user to access an assistance document from the assistance document database;

analyze the assistance document with the predictive model;

generate messaging topic matching data with the predictive model by matching the assistance document to messaging content from the messaging content database based on analysis of the assistance document and the user related data;

generate a personalized message based on the messaging topic matching data and rewording the messaging content to mimic a writing style of the user as indicated by the search query, and further based on adjusting the messaging content to include at least a portion of wording included in the assistance document, wherein the personalized message promotes a product or service of the financial management system; and present the personalized message and the assistance document to the user in real time on a display screen.

2. The system of claim 1, wherein the Latent Dirichlet Allocation model is an unsupervised Latent Dirichlet Allocation model.

3. The system of claim 1, wherein the predictive model includes a multi-class classifier.

4. The system of claim 3, wherein the multi-class classifier is a supervised multi-class classifier.

5. The system of claim 1, wherein the financial management system includes one or more of a tax return preparation system, a bookkeeping system, an accounting system, a budgeting system, or a financial transaction tracking system.

6. The system of claim 1, wherein execution of the instructions further causes the processor to:
generate search results based on the search query and including links to one or more assistance documents from the assistance documents database; and
output the search results to the user.

7. The system of claim 6, wherein receiving the access request includes receiving an indication that the user has selected the assistance document from among the search results.

8. The system of claim 7, wherein execution of the instructions further causes the system to:
analyze the search query with the predictive model; and
generate the messaging topic matching data based on analysis of the search query.

9. The system of claim 7, wherein execution of the instructions further causes the system to:
analyze the search query; and
generate the personalized message by adjusting the messaging content to include wording specific to the search query.

10. The system of claim 1, wherein the user related data further includes data indicating how the user has previously interacted with the financial management system.

11. The system of claim 1, wherein the personalized message includes an advertisement promoting the product or the service of the financial management system.

12. The system of claim 1, wherein presenting the personalized message and the assistance document to the user in real time includes presenting the personalized message and the assistance document in a same webpage.

13. The system of claim 1, wherein receiving the access request includes the user requesting a webpage associated with the assistance document via a web browser.

14. The system of claim 13, wherein receiving the access request includes the user selecting the webpage from search results provided by a third-party website.

15. A method performed by one or more processors of a system, the method comprising:

training, with one or more machine learning processes, a predictive model to match assistance documents from an assistance document database of a financial management system to messaging content stored in a messaging content database, wherein the predictive model includes at least a Latent Dirichlet Allocation model and an uplift model;

receiving user related data including at least demographic data related to a user and financial data related to the user;

receiving a search query from the user for information regarding one or more topics associated with the financial management system;

receiving, based on the search query, an access request from the user to access an assistance document from the assistance document database;

analyzing the assistance document with the predictive model;

generating messaging topic matching data with the predictive model by matching the assistance document to messaging content from the messaging content database based on analysis of the assistance document and the user related data;

generating a personalized message based on the messaging topic matching data and rewording the messaging content to mimic a writing style of the user as indicated by the search query, and further based on adjusting the messaging content to include at least a portion of wording included in the assistance document, wherein the personalized message promotes a product or service of the financial management system; and presenting the personalized message and the assistance document to the user in real time on a display screen.

16. The method of claim 15, wherein the Latent Dirichlet Allocation model is an unsupervised Latent Dirichlet Allocation model.

17. The method of claim 15, wherein the predictive model includes a multi-class classifier.

18. The method of claim 17, wherein the multi-class classifier is a supervised multi-class classifier.

19. The method of claim 15, wherein the financial management system includes one or more of a tax return preparation system, a bookkeeping system, an accounting system, a budgeting system, or a financial transaction tracking system.

20. The method of claim 15, further comprising:
generating search results based on the search query and including links to one or more assistance documents from the assistance documents database; and
outputting the search results to the user.

21. The method of claim 20, wherein receiving the access request includes receiving an indication that the user has selected the assistance document from among the search results.

22. The method of claim 21, further comprising:
analyzing the search query with the predictive model; and
generating the messaging topic matching data based on analysis of the search query.

23. The method of claim 21, further comprising:
analyzing the search query; and
generating the personalized message by adjusting the messaging content to include wording specific to the search query.

24. The method of claim 15, wherein the user related data further includes data indicating how the user has previously interacted with the financial management system.

25. The method of claim 15, wherein the personalized message includes an advertisement promoting the product or the service of the financial management system.

26. The method of claim 15, wherein presenting the personalized message and the assistance document to the user in real time includes presenting the personalized message and the assistance document in a same webpage.

27. The method of claim 15, wherein receiving the access request includes the user requesting a webpage associated with the assistance document via a web browser.

28. The method of claim 27, wherein receiving the access request includes the user selecting the webpage from search results provided by a third-party website.

29. A method performed by one or more processors of a system, the method comprising:
training, with one or more machine learning processes, a predictive model to match a user of a financial management system to messaging content stored in a messaging content database of the financial management system, wherein the predictive model includes at least a Latent Dirichlet Allocation model and an uplift model;
receiving user related data including at least demographic data related to the user and financial data related to the user;
receiving, from the user, a search query for information regarding one or more topics associated with the financial management system;
outputting search results to the user based on the search query;
receiving selection data from the user selecting, from the search results, an assistance document from an assistance document database;
analyzing the search query with the predictive model;
generating messaging topic matching data with the predictive model by matching the user to messaging content from the messaging content database based on analysis of the search query and the user related data;
generating a personalized message based on the messaging topic matching data and rewording the messaging content to mimic a writing style of the user as indicated by the search query, and further based on adjusting the messaging content to include at least a portion of wording included in the assistance document, wherein the personalized message promotes a product or service of the financial management system; and
presenting the personalized message and the assistance document to the user in real time on a display screen.

30. The method of claim 29, further comprising:
analyzing the assistance document with the predictive model; and
generating the personalized message based on analysis of the assistance document and the search query.

* * * * *